United States Patent
Wu et al.

(10) Patent No.: US 7,242,342 B2
(45) Date of Patent: Jul. 10, 2007

(54) SUPER-RESOLUTION BASED ON FREQUENCY DOMAIN INTERFEROMETRIC PROCESSING OF SPARSE MULTI-SENSOR MEASUREMENTS

(75) Inventors: Pei-Rin Wu, Lincoln, MA (US); Michael T. Burrows, Lexington, MA (US); Gordon L. Dryden, Lawrence, MA (US)

(73) Assignee: Sparta, Inc., Lake Forest, CA (US)

( * ) Notice: Subject to any disclaimer, the term of this patent is extended or adjusted under 35 U.S.C. 154(b) by 3 days.

(21) Appl. No.: 11/130,746

(22) Filed: May 17, 2005

(65) Prior Publication Data

US 2006/0077091 A1   Apr. 13, 2006

Related U.S. Application Data

(60) Provisional application No. 60/599,608, filed on Aug. 6, 2004.

(51) Int. Cl.
*G01S 13/90* (2006.01)

(52) U.S. Cl. .................. 342/25 C; 342/25 D; 342/189; 342/195

(58) Field of Classification Search .............. 342/25 C, 342/25 D, 189, 195; 356/450; 367/124
See application file for complete search history.

(56) References Cited

U.S. PATENT DOCUMENTS

| | | | |
|---|---|---|---|
| 5,945,940 A | 8/1999 | Cuomo | |
| 2006/0077091 A1* | 4/2006 | Wu et al. | 342/25 C |

* cited by examiner

*Primary Examiner*—Dan Pihulic
(74) *Attorney, Agent, or Firm*—Stetina Brunda Garred & Brucker

(57) ABSTRACT

A system for obtaining frequency domain interferometric super-resolution of a target scatterer, having a first and a second coherent transceivers, a mutual coherent sub-system and an estimation system. The first and second coherent transceivers are operative to produce a plurality of first and second sampling signals separated from each other by a predetermined frequency difference within the first and second sub-band, respectively. The mutual coherent sub-system is coupled to the first and second coherent transceivers to receive phase and amplitude of the first and second sampling signals, so as to evaluate an ambiguous range estimate from a pair of the first and second sampling signals and an unambiguous range estimate from a pair of the first and/or second sampling signals. The estimation system follows the mutual coherent sub-system to reconcile the ambiguous and unambiguous range estimates so as to obtain a target signature with a super-resolution defined by a frequency offset between the first and second sub-bands.

16 Claims, 2 Drawing Sheets
(1 of 2 Drawing Sheet(s) Filed in Color)

SUPER-RESOLUTION BASED ON FREQUENCY DOMAIN INTERFEROMETRIC PROCESSING OF SPARSE MULTI-SENSOR MEASUREMENTS

CROSS-REFERENCE TO RELATED APPLICATIONS

This application claims the benefit of U.S. Provisional Application No. 60/599,608 entitled "SUPER-RESOLUTION BASED ON FREQUENCY DOMAIN INTERFEROMETRIC PROCESSING OF SPARSE MULTI-SENSOR MEASUREMENTS" filed Aug. 6, 2004, the entirety of the disclosure of which is expressly incorporated herein by reference.

STATEMENT RE: FEDERALLY SPONSORED RESEARCH/DEVELOPMENT

This application is a subject invention under Contract/Grant No. HQ0006-03-C-0049 with the United States Government, and as such the United States Government has rights therein.

BACKGROUND OF THE INVENTION

The present invention relates in general to a method of obtaining super-resolution in range for sensor systems such as electromagnetic, acoustic, electro-optics and other spectral regimes particularly where the individual sensors are limited in bandwidth. More particularly, the present invention relates to a method for producing two-dimensional (range-Doppler) images with super-resolution from a system having multiple narrow-band radars.

For both radar and sonar systems, high range resolution is a desirable property to improve the ability of the sensor in regard of target identification and discrimination. A desire to obtain resolution beyond the operating bandwidth defined by the Fourier operation has led to numerous techniques such as the Burg Algorithm which extrapolates data in the frequency domain. However, the resolution achieved by the Burg Algorithm is limited to a factor of 2 or 3 (see P. R. Wu, "A Criterion for Radar Resolution Enhancement with Burg Algorithm", IEEE Trans., Aerospace and Electronic Systems, Vol. 31, No. 3, July, 1995), the disclosure of which is expressly incorporated herein by reference.

Other techniques have been proposed for fusing the data collected by two sensors with different operating frequencies. These techniques use estimated signals derived from two different bands to fill the empty gap so as to create a continuous ultra-wide bandwidth. The fidelity of these estimated signals is directly proportional to the inherent bandwidths of the two sensors. See "J. E. Piou, K. M. Cuomo and J. T. Mayhan, "A State-Space Technique for Ultrawide-Bandwidth Coherent Processing", Technical Report 1054, Lincoln laboratory, Massachusetts Institute of Technology, 20 Jul. 1999 and K. M. Cuomo, U.S. Pat. No. 5,945,940, "Coherent Ultra-wideband Processing of Sparse Multi-sensor/Multi-spectral Radar Measurements" Aug. 31, 1999, the disclosures of which are expressly incorporated herein by reference. However, none of these prior art techniques has taken advantage of the interferometer principle; and therefore, full-resolution benefit implied by the frequency separation of the sensors has not been achieved.

BRIEF SUMMARY OF THE INVENTION

A process is provided by the present invention to obtain super-resolution from sparse multi-sensor measurements by applying the principles of interferometry to the frequency domain. The process involves comparing the phase of signals received by the sensors operating in separate frequency bands to obtain range estimates. Ambiguities in the range estimates are removed by phase comparisons made within each band.

The removal of range ambiguities is performed simultaneously over a number of successive pulses in time to reduce the number of frequency-shifted pairs required in each band. By processing in two dimensions the bandwidth requirements for each band is reduced.

The process can extend to a system having more than two sensors to achieve super-resolved range-doppler images. Further, the multiple sensors can coexist on the same platform or be physically separate from each other.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These as well as other features of the present invention will become more apparent upon reference to the drawings wherein.

DETAILED DESCRIPTION OF THE INVENTION

Figure 1:
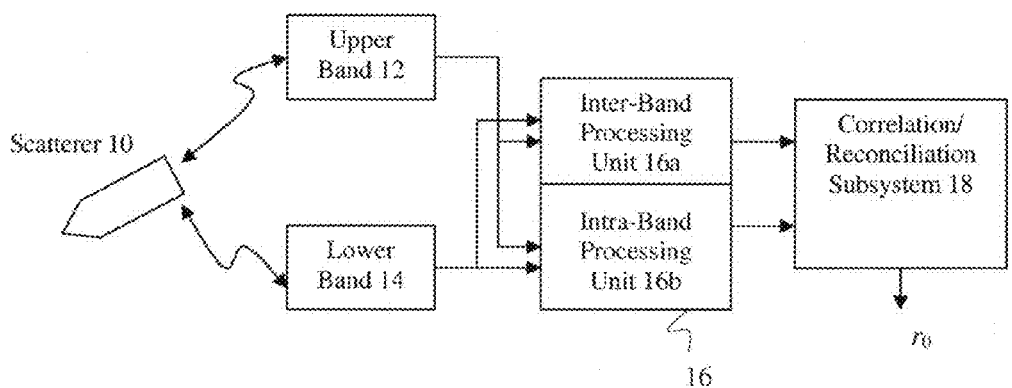
FIG. 1 is a block diagram for obtaining super-resolution based on frequency domain interferometric processing of sparse multi-sensor measurement.

As shown in FIG. 1, the theoretical basis for frequency-domain interferometry can be illustrated by a system using a single scattering center illuminated by radar or sonar sensors operating in two frequency bands, namely, an upper band and a lower band separated from each other by $\Delta F$ Hz. As shown, the system has two sensors (transceivers) 12 and 14 operative to generate and transmit acoustic, optical or electromagnetic illumination and to receive reflected signals of the illumination from the scattering center 10. The bandwidth of the upper and lower bands is denoted as B. As the resolution obtained from the system is proportional to the frequency separation $\Delta F$ between the upper and lower bands, the frequency separation $\Delta F$ is preferably no less than ten times the bandwidth B. That is, the bandwidth B is no more than 10% of the frequency separation $\Delta F$.

The location of the scattering center 10 is referred as a range $r_0$ with respect to a phase reference origin. When illumination is generated by the upper band and lower band transceivers 12 and 14, reflected signals of the illumination from the scattering center 10 are received at each of the transceivers 12 and 14. The reflected signals received at the transceivers 12 and 14 are then input to a processing subsystem 16, such as a mutual coherent processing subsystem. Preferably, the signals received by each of the transceivers 12 and 14 have already been time aligned (including but not limited to interpolation, if necessary) using time marks provided by synchronized clocks at the transceivers 12 and 14. The mutual coherent processing subsystem 16 includes an inter-band processing unit 16a operative to process the time-aligned sampling signals obtained from different bands, and an intra-band processing unit 16b operative to process the time-aligned sampling signals obtained from the same bands.

The sampling signals from two transceivers 12 and 14 superposed and processed in the mutual coherent processing subsystem 16 are typically in the form including a base-band in-phase component $I_{mn}$ and a base-band orthogonal component $Q_{mn}$ expressed as:

$$\begin{bmatrix} I_{mn} \\ Q_{mn} \end{bmatrix} = \begin{bmatrix} a\cos(\psi_{mn}) \\ a\sin(\psi_{mn}) \end{bmatrix}, \quad (1)$$

where $a$ is the amplitude, $\psi_{mn}$ is the phase of the reflected signal, and the indices m and n indicate the sampling time $t_m$ and frequency $f_n$. For simplicity, the amplitude is assumed independent of time and frequency. In general, the phase can be expressed as:

$$\psi_{mn} = 4\pi f_n(r_0 + \dot{r} t_m)/v \quad (2),$$

where $\dot{r}$ is the range rate, and $v$ is the wave propagation velocity of the sampling signals. For the time-aligned signals obtained from different bands separated by $\Delta F$, the range $r_0$ can be solved by the relationship with the phase difference $\Delta\psi$ between the bands at a common time as:

$$r_0 = (v/4\pi)(\Delta\psi/\Delta F) + k\Delta r \quad (3),$$

where $\Delta r = v/(2\Delta F)$ is the range interval, and k is an unknown integer. As k is unknown, the phase difference $\Delta\psi$ is determined within an unknown integral multiple of $2\pi$, so that ambiguity of the range $r_0$ arises.

To remove the ambiguity of the range $r_0$, sampling signals are obtained at different frequencies of the same band. That is, the upper band and/or the lower band are divided into a plurality of segments with a bandwidth of $\delta F$, and sampling signals are obtained from adjacent segments. The sampling signals received at the transceivers 12 and 14 are input to the intra-band processing unit 16b of the mutual coherent processing subsystem 16. Similar to the above, the range estimate r can be obtained by evaluating the phase difference $\delta\psi$ between adjacent samples within the same band. The range estimate can be expressed as:

$$r_0' = (v/4\pi)(\delta\psi/\delta F) \quad (4).$$

The range estimate $r_0'$ is typically less precise than the range $r_0$ estimated by inter-band samples because the phase difference $\delta\psi$ which is much smaller than the phase difference $\Delta\psi$, is more perturbed by noise. However, the range estimate $r_0'$ can be used to identify which of the ambiguous range estimates $r_0$ is the correct one. In other words, the range estimate $r_0'$ can be used to determine the unknown integer k.

If the above process extends over more than one time-sample interval, the greater dimensionality as provided significantly reduces the bandwidth B requirement for each individual band. In addition, the process over a plurality of time-sample intervals allows the Doppler processing to be included, such that both the range and the range rate of the target can be evaluated. More specifically, the range is evaluated as described as above, which uses phase differences between samples separated in frequency, while the range rate is evaluated as $\dot{r} = (v/4\pi f_n)(d\psi/dt)$, where $d\psi$ is the phase difference between samples separated in time and dt is the time sampling interval.

Figure 2:
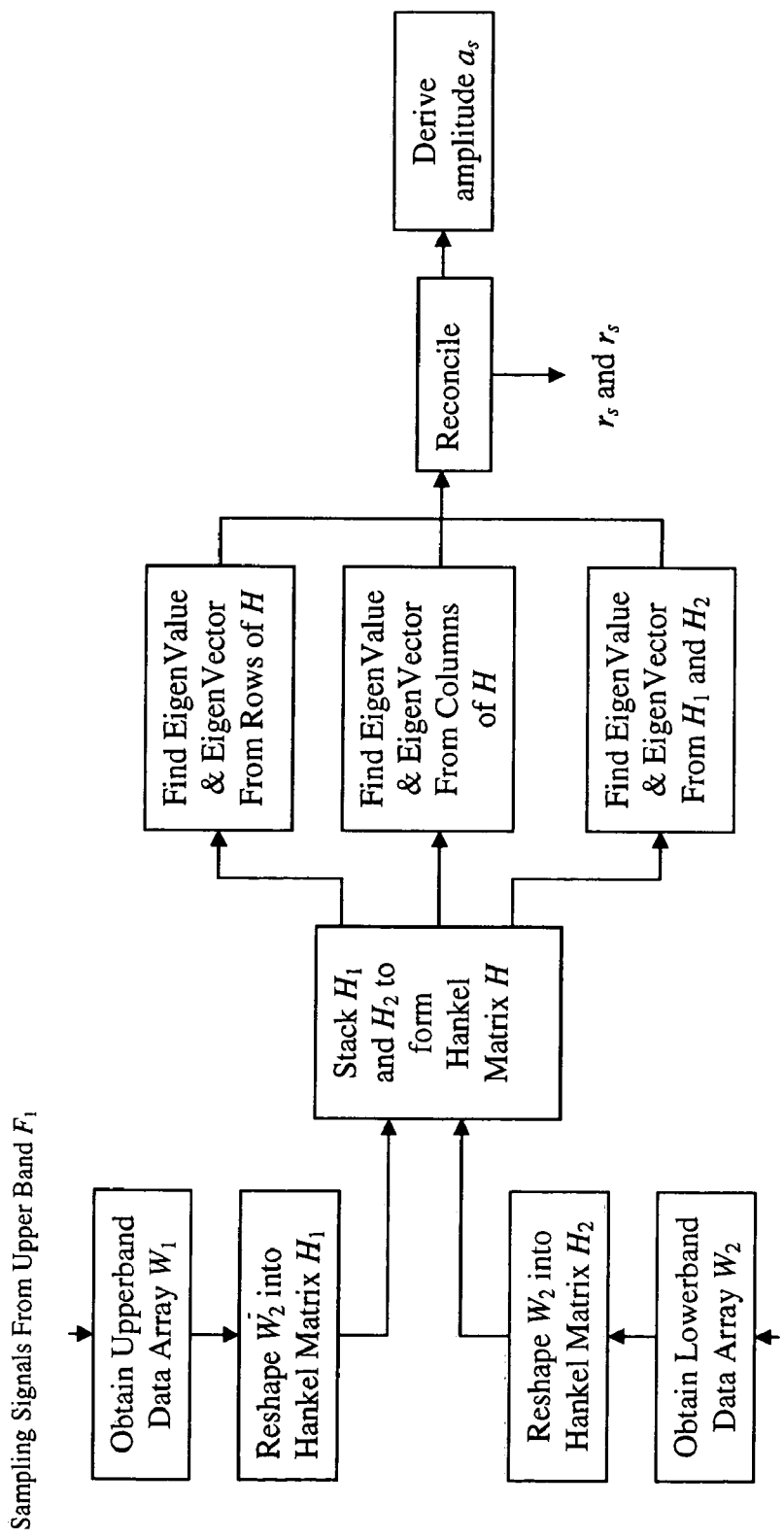
FIG. 2 is a flow chart showing the method for obtaining super-resolution based on frequency domain interferometric processing of sparse multi-sensor measurement.

FIG. 2 provides a flow chart of the method of the present invention to obtain the super-resolution based on frequency domain interferrometric processing of sparse multi-sensor measurements.

In a more general case where the target contains many scattering centers with various amplitudes, a successful solution depends on distinguishing between the centers by using techniques from linear algebra such as those based on subspace rotational invariance. The solution can also include Doppler processing, and so be used to form range-Doppler images of the target.

When there are two or more scattering centers, the signals reflected from each of the scattering centers for each band can be summed up or superposed in the complex form of $I_{mn} + iQ_{mn}$, where m and n indicates the sampling time and frequency. Therefore, there are m×n sampling signals obtained from each band, which can be expressed by a matrix including m×n elements. The sampling signals reflected from all the scattering centers for the upper and lower bands $F_1$ and $F_2$ at a specific time $t_0 + m\delta t$ and frequency $f_0 + n\delta f$ can thus be expressed as $w_{mn}^{ub}$ and $w_{mn}^{lb}$. Therefore, the sampling signals at all time and frequencies intervals for the upper and lower bands can thus be expressed as:

$$W_1 = \begin{bmatrix} w_{11}^{ub} & w_{12}^{ub} & \cdots & w_{1(n-1)}^{ub} & w_{1n}^{ub} \\ w_{21}^{ub} & & \cdots & & w_{2n}^{ub} \\ \vdots & & \cdots & & \vdots \\ w_{(m-1)1}^{ub} & & \cdots & & w_{(m-1)(n-1)}^{ub} \\ w_{m1}^{ub} & w_{m2}^{ub} & \cdots & w_{m(n-1)}^{ub} & w_{mn}^{ub} \end{bmatrix}, \text{ and} \quad (5)$$

$$W_2 = \begin{bmatrix} w_{11}^{lb} & w_{12}^{lb} & \cdots & w_{1(n-1)}^{lb} & w_{1n}^{lb} \\ w_{21}^{lb} & & \cdots & & w_{2n}^{lb} \\ \vdots & & \cdots & & \vdots \\ w_{(m-1)1}^{lb} & & \cdots & & w_{(m-1)(n-1)}^{lb} \\ w_{m1}^{lb} & w_{m2}^{lb} & \cdots & w_{m(n-1)}^{lb} & w_{mn}^{lb} \end{bmatrix} \quad (6)$$

The canonical expression of each element of the above matrices can be written $a\exp(im\alpha + in\beta)$, where a is the amplitude and $\alpha$ and $\beta$ are the data frequencies in radians per row or column of the sum. In this embodiment, the upper band is at the frequency $F_1$ and the lower band is at the frequency $F_2$, and the frequency separations between the upper and lower bands is $\Delta F$, which is equal to "$F_1 - F_2$". The canonical form of the dual data arrays $W_1$ and $W_2$ implies that, for the separate contribution of each scattering center to the data arrays, the phase increment from sampling signal to sampling signal down the columns is the constant $\alpha$, and the phase increment from sampling signal to sampling signal down along the row is the constant $\beta$. The same is true of the contribution of individual scattering center to any sub-block of the sampling signals. Namely, the contribution of individual scattering center to any sub-block of the arrays shifts in phase by $\alpha$ and $\beta$ if the sub-block is shifted down by one row or right by one column.

To simplify the description, 3×3 arrays are used as examples for $W_1$ and $W_2$ in this embodiment. The arrays of sampling signals $W_1$ and $W_2$ are transformed into the matrices $H_1$ and $H_2$ as:

$$W_1 = \begin{bmatrix} w_{11}^{ub} & w_{21}^{ub} & w_{31}^{ub} \\ w_{12}^{ub} & w_{22}^{ub} & w_{32}^{ub} \\ w_{13}^{ub} & w_{23}^{ub} & w_{33}^{ub} \end{bmatrix} \Rightarrow H_1 = \begin{bmatrix} w_{11}^{ub} & w_{21}^{ub} & w_{12}^{ub} & w_{22}^{ub} \\ w_{21}^{ub} & w_{31}^{ub} & w_{22}^{ub} & w_{32}^{ub} \\ w_{12}^{ub} & w_{22}^{ub} & w_{13}^{ub} & w_{23}^{ub} \\ w_{22}^{ub} & w_{32}^{ub} & w_{23}^{ub} & w_{33}^{ub} \end{bmatrix} ; \text{ and} \quad (7)$$

$$W_1 = \begin{bmatrix} w_{14}^{lb} & w_{24}^{lb} & w_{34}^{lb} \\ w_{25}^{lb} & w_{25}^{lb} & w_{35}^{lb} \\ w_{16}^{lb} & w_{26}^{lb} & w_{36}^{lb} \end{bmatrix} \Rightarrow H_2 = \begin{bmatrix} w_{14}^{lb} & w_{24}^{lb} & w_{15}^{lb} & w_{25}^{lb} \\ w_{24}^{lb} & w_{34}^{lb} & w_{25}^{lb} & w_{35}^{lb} \\ w_{15}^{lb} & w_{25}^{lb} & w_{16}^{lb} & w_{26}^{lb} \\ w_{25}^{lb} & w_{35}^{lb} & w_{26}^{lb} & w_{36}^{lb} \end{bmatrix} , \quad (8)$$

respectively.

The transformation process can be referred to "Two-dimensional ESPRIT with Tracking for Radar Imaging and Feature Extraction" by M. L. Burrows, IEEE Transactions on Antennas and Propagation, Vol. AP-52, No. 2, February 2004, which is expressly incorporated by reference herein-with. Practically, the arrays typically have different sampling intervals in time and frequency. Therefore, the arrays need to be preconditioned by clock synchronization and interpolation to achieve common sampling intervals in both the time and frequency dimensions.

As expressed above, each of the sub-blocks is reshaped to form a row in the corresponding transformed matrix. The sub-block location sequence used to form the consecutive rows for two data arrays may be different based on the selection of degree of freedom. The rows originating from the array $W_2$ are stacked under those originating in the array $W_1$ as the Hankel Matrix H:

$$H = \begin{bmatrix} H_1 \\ H_2 \end{bmatrix} \quad (9)$$

Therefore, each row of the Hankel Matrix H is a sub-block (sub-array) of the data arrays $W_1$ or $W_2$. FIG. 2 shows the dual band interferometric process in the ideal case that there is no noise and the rank of the Hankel Matrix H is equal to the number of the scattering centers. The solution of the Hankel Matrix starts with deriving the eigenvector $x_s$ for the specific scattering center s and corresponding eigenvalue in the form of the coupled generalized-eigenvalue problems of $H_{t(m>1)}x_s=\exp(i\alpha_s)H_{t(m-1)}x_s$ and $H_{f(n>1)}x_s=\exp(i\beta_s)H_{f(n-1)}x_s$, and $x_s$ is orthogonal to the elements of all the rows for all scattering centers except from the elements contributed from the scattering center s, and $H_{t(m-1)}$, $H_{t(m>1)}$, $H_{f(n-1)}$ and $H_{f(n>1)}$ are particular row and column selections from the master matrix H whose rows are elements of the sub-blocks of the arrays $W_1$ and $W_2$ reshaped as the row vectors as shown in the matrices $H_1$ and $H_2$. Thereby, the eigenvalues $\alpha_s$ and $\beta_s$ can be derived to obtain the unambiguous range and the unambiguous range rate from the following equations, respectively:

$$(H_{t(m>1)}-e^{i\alpha_s}H_{t(m-1)})x_s=0 \quad (10); \text{ and}$$

$$(H_{f(n>1)}-e^{i\beta_s}H_{f(n-1)})x_s=0 \quad (11),$$

where m and n are positive integers and indicate the row and column numbers in the data matrices $W_1$ and $W_2$.

As mentioned above, although the phase difference between the intra-band sampling signals provides the unambiguous range, the range is very much perturbed by noise due to the very small frequency difference between the adjacent sampling signals. Therefore, in this embodiment, when the unambiguous range and range rate are obtained by the derivation of phase $\alpha_s$ and $\beta_s$, a dual-band interferometric processing is used to obtain an ambiguous range by the inter-band phase, which is denoted as $\delta_s$ in the following equation:

$$[H_2-e^{i\delta_s}H_1]=0 \quad (12).$$

Once the eigenvalues $\alpha_s$, $\beta_s$, and $\delta_s$ have been evaluated, the contribution $H_s$ from each scattering center to the Hankel Matrix H can be reconstructed as $Hx_s=a_sH_sx_s$, where $a_s$ is the amplitude of the scattering center and $x_s$ is the eigenvalue that selects just the contribution of the scattering center s to the Hankel matrix. The amplitude can then be expressed as:

$$a_s=(y_s^h H x_s)/(y_s^h y_s), \quad (13)$$

where $y_s=H_s x_s$, and the superscript h denotes Hermitian conjugate.

A modification of the above procedure allows a general case of unknown number of scattering centers in the noise subspace is to use the singular value decomposition $H=U\Sigma V^h$ first, such that the number S of significant singular values of H can be determined, where S is a diagonal matrix of singular values of H, and U and V are left and right unitary matrices of corresponding singular vectors, respectively. The row selections are then made from first S columns of U. Thereby, $H_{t(m-1)}$, $H_{t(m>1)}$, $H_{f(n-1)}$ and $H_{f(n>1)}$ are replaced by $U_{t(m-1)}$, $U_{t(m>1)}$, $U_{f(n-1)}$ and $U_{f(n>1)}$. Again, m and n are positive integers. The coupled generalized-eigenvalue problems are then written as $U_{t(m>1)}=\exp(i\alpha_s)U_{t(m-1)}x_s$ and $U_{f(n>1)}=\exp(i\beta_s)U_{f(n-1)}x_s$, implying that exp $(im\alpha_s)$ and $\exp(in\beta_s)$ are the eigenvalues of the matrices $U_{t(m-1)}^+U_{t(m>1)}$ and $U_{f(n-1)}^+U_{f(n>1)}$ corresponding to their common eigenvector $x_s$.

The third eigenvalue obtained from the dual-band interferometric processing can be obtained similarly. Specifically, two additional row selections $U_1$ and $U_2$ are made from U. They consist, respectively, of all the rows of U originating from $W_1$ and $W_2$ separately. The added eigenvalue problem is then $U_2=\exp(i\delta_s)U_1x_s$. The common eigenvalue is the same as $\exp(i\delta_s)$, and the ambiguous range is $r_s=(v/4\pi)(\delta/\Delta F)+k\Delta r$, where $\Delta r=v/(2\Delta F)$ and k is an unknown integer.

In practice, to ensure that the three lists of eigenvalues are properly identified in groups of three, having each group corresponding to a particular scatter, the eigenvalues $x_s$ are evaluated just once as the eigenvectors of the matrix sum $U_{t(m-1)}^+U_{t(m>1)}+U_{f(n-1)}^+U_{f(n>1)}+U_1^+U_2$. The solution for the three eigenvalues are then $\exp(i\alpha_s)=x_s^h U_{t(m-1)}^+U_{t(m>1)}x_s$, $\exp(i\beta_s)=x_s^h U_{f(n-1)}^+U_{f(n>1)}x_s$, and $\exp(i\delta_s)=x_s^h U_1^+U_2 x_s$. This has the additional advantage that the same high resolution is obtained for all three evaluations.

The phase offset between two bands is likely to be greater than $2\pi$. This makes the corresponding range estimate ambiguous. On the other hand, this large phase difference is more easily estimated accurately in the presence of noise. Therefore, it is preferred to use the less accurate unambiguous range estimate determined by the inter-column phase increment $\beta$ to resolve the ambiguity in the more accurate but ambiguous range estimate determined by the inter-band phase increment $\delta$.

The amplitudes can be evaluated by using $V^{-1}x_s$ instead of $x_s$ so as to select the contribution of the scattering centers from the U matrices evaluated in the singular value decomposition $H = U \, V^h$, such that $a_s = (y_x^h U x_s)/(y_s^h y_s)$, where $y_s = H_s V^{-1} x_s$.

Figure 3:
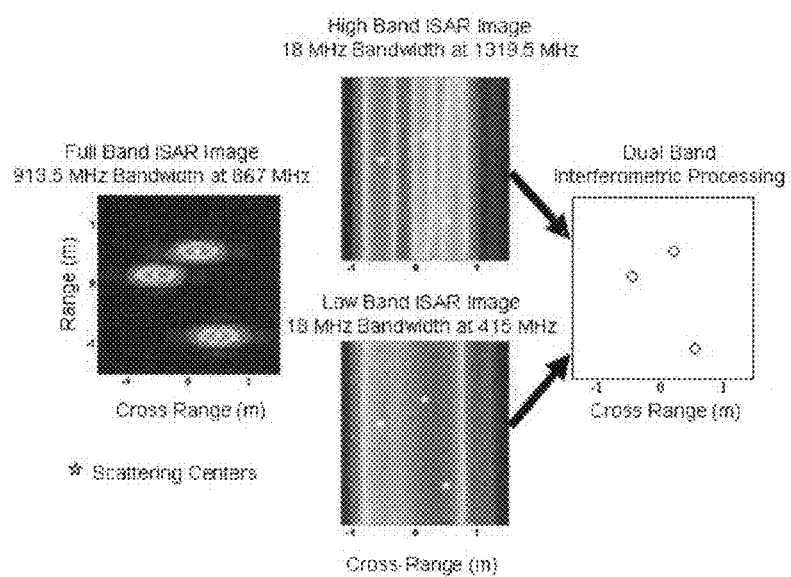
FIG. 3 is an example showing the dual-band interferometric processing of synthetic static-range data collected on three equal-amplitude scattering centers.

Referring to FIG. 3, a result of a dual-band interferometric processing of synthetic static-range data collected on three equal-amplitude scattering centers is shown. As shown, two 18 MHz-wide bands are centered at 424 MHz and 1,319.5 MHz. Five frequency samples with 4.5 MHz spacing, and twenty-five samples with 2-degree spacing are used in each band. The signal-to-noise ratio was set at 30 dB. The dimension of the sub-block is 3-by-2.

Different bands of the input data were used to generate the Fourier images in three of the panels. The whole 913.5-MHz filled band was used for the left one, and the two 18-MHz bands were used for the two middle panels. The right panel shows the locations of the scattering centers by interferometric processing of the data in just the two narrow bands. As shown, the dual band interferometric processing produces as good an image as conventional Fourier processing of the whole 913.5 MHz but uses only 4% of the bandwidth. Thus the effective resolution power has been increased by a factor of 25.

The above description is given by way of example, and not limitation. Given the above disclosure, one skilled in the art could devise variations that are within the scope and spirit of the invention. Further, the various features of this invention can be used along, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. A system for obtaining frequency domain interferometric super-resolution of a target scatterer, comprising:
    a first coherent transceiver operating on a first sub-band, the first coherent transceiver being operative to produce a plurality of first sampling signals separated from each other by a predetermined frequency difference within the first sub-band;
    a second coherent transceiver operating on a second sub-band, the second coherent transceiver being operative to produce a plurality of second sampling signals separated from each other by the predetermined frequency difference within the second sub-band;
    a sub-system coupled to the first and second coherent transceivers, the sub-system being operative to receive phase and amplitude of the first and second sampling signals, so as to evaluate an ambiguous range estimate from a pair of the first and second sampling signals and an unambiguous range estimate from a pair of the first, the second or the first and second sampling signals; and
    an estimation system coupled to the sub-system to reconcile the ambiguous and unambiguous range estimates so as to obtain a target signature with a super-resolution defined by a frequency offset between the first and second sub-bands.

2. The system of claim 1, wherein the first sub-band and the second sub-band each has a bandwidth no more than 10% of a frequency spacing therebetween.

3. The system of claim 1, wherein the first and second signals are electromagnetic signals.

4. The system of claim 1, wherein the first and second signals are electro-optic signals.

5. The system of claim 1, wherein the first and second signals are acoustic signals.

6. A method of obtaining frequency domain interferometric super-resolution of a target scatterer, comprising:
    transmitting illumination at a first sub-band and a second sub-band;
    obtaining sampling signals at the first sub-band reflected from the target scattering center;
    obtaining sampling signals at the second sub-band reflected from the target scattering center;
    estimating an ambiguous range from a pair of inter-band sampling signals;
    estimating an unambiguous range from a pair of intra-band sampling signals; and
    resolving the ambiguous range to obtain a target signature with a super-resolution defined by a frequency offset between the first and second sub-bands.

7. The method of claim 6, further comprising a step of time aligning the sampling signals.

8. The method of claim 6, wherein the first and second sub-bands each has a bandwidth no more than 10% of the frequency offset therebetween.

9. The method of claim 6, wherein the sampling signals are simultaneous.

10. The method of claim 6, wherein the sampling signals are alternating in time.

11. The method of claim 6, wherein the target scatterer includes a plurality of scattering centers.

12. The method of claim 6, wherein the target scatterer is stationary.

13. The method of claim 6, wherein the target scatterer is in motion.

14. A system for obtaining frequency domain interferometric super-resolution of a target scatterer, operative to generate illumination samples at an upper band and a lower band, the system includes:
    a sub-system operative to obtain an ambiguous range estimate from inter-band samples of the upper band and the lower band and an unambiguous range estimate from intra-band samples of the upper band, the lower band, or the upper and lower bands; and
    an estimation system coupled to the sub-system, the estimation system being operative to obtain a target signature with a super-resolution from the unambiguous range estimate and the ambiguous range estimate.

15. The system of claim 14, wherein the upper band and the lower band each has a bandwidth no more than 10% of a frequency offset between the upper and the lower bands.

16. A system for obtaining frequency domain interferometric super-resolution of a target scatterer, operative to generate illumination two-dimensional upper-band and lower-band samples at various times and frequencies, the system comprising:
    a first system operative to receive and reshape the two-dimensional samples, so as to obtain a range estimate; and
    a second system operative to resolve ambiguity of the range estimate by frequencies shifted pairs of the two-dimensional samples, so as to define a target signature with a super-resolution defined by a frequency offset between the upper band and the lower band.

* * * * *